(12) United States Patent
Chaffey

(10) Patent No.: US 8,184,906 B2
(45) Date of Patent: May 22, 2012

(54) SYSTEM AND METHOD FOR CREATING IMAGES

(76) Inventor: Samuel Chrichton Chaffey, Christchurch (NZ)

(*) Notice: Subject to any disclaimer, the term of this patent is extended or adjusted under 35 U.S.C. 154(b) by 1003 days.

(21) Appl. No.: 12/213,697

(22) Filed: Jun. 23, 2008

(65) Prior Publication Data

US 2009/0003688 A1 Jan. 1, 2009

Related U.S. Application Data

(60) Provisional application No. 60/929,296, filed on Jun. 21, 2007.

(51) Int. Cl.
*G06K 9/34* (2006.01)

(52) U.S. Cl. .......................... 382/175

(58) Field of Classification Search .......... 348/36; 352/69; 353/30; 359/725; 382/175, 384
See application file for complete search history.

(56) References Cited

U.S. PATENT DOCUMENTS 6,665,003 B1 * 12/2003 Peleg et al. ............... 348/36
7,719,563 B2 * 5/2010 Richards ................. 348/36

* cited by examiner

*Primary Examiner* — Gregory F Cunningham
(74) *Attorney, Agent, or Firm* — Jacobson Holman PLLC

(57) ABSTRACT

The invention provides a method of replicating the primary human field of view in an image. The method comprises receiving at least three digital images of a scene, the digital images comprising a center image facing a scene directly, a center left image obtained by rotating an image capture device a predefined angle to the left of center and a center right image obtained by rotating the image capture device a predefined angle to the right of center; manipulating the center image, the center left image, and the center right image on a data processing device; obtaining a composite image from the manipulated center image, center left image and center right image conformed to the first virtual model; manipulating the composite image on the data processing device; obtaining a distortion adjusted image from the composite image conformed to the second virtual model; creating a physical image of the distortion adjusted image; and physically manipulating the physical image to form a physical image having a planar center portion and curved left and right portions extending toward a viewpoint.

10 Claims, 14 Drawing Sheets

SYSTEM AND METHOD FOR CREATING IMAGES

This is a complete application claiming benefit of provisional 60/929,296 filed Jun. 21, 2007.

FIELD OF THE INVENTION

The present invention relates to a system and method for creating images and in particular, to a system and method for creating images that replicate the primary human field of view.

BACKGROUND TO THE INVENTION

Human sight takes in a considerably larger undistorted horizontal and vertical field of view than is observed through the lens of a camera. Thus normal photographs do not replicate the normal primary human field of view. The larger human field of view gives us the ability to see a far greater depth of field than can be represented in any photograph.

As our primary human field of view is 55 degrees vertical by 124 degrees horizontal, an image must be printed to best represent this view. In order to accomplish this we need to simulate a view of 9.571 mm lens in the Horizontal and 25.933 mm in the vertical.

While landscape photographs provide a wider view than a 35 mm photograph there is distortion between a landscape photograph and the human field of view. It would be desirable particularly in the construction industry and for court hearings to be able to provide a replica of the primary human field of view.

While there are lenses that provide wide angles such lenses cause considerable distortion, and there are no lenses available that can accurately photograph the primary human field of view.

It is an object of the present invention to provide an improved method and system for presenting a photographic representation of the human field of view or at least provide the public or industry with a useful choice.

SUMMARY OF THE INVENTION

In a first embodiment the invention comprises a method of replicating the primary human field of view of an image, the method comprising:
  receiving at least three digital images of a scene, the digital images comprising a centre image facing a scene directly, a centre left image obtained by rotating an image capture device a predefined angle to the left of centre and a centre right image obtained by rotating the image capture device a predefined angle to the right of centre;
  manipulating the centre image, the centre left image, and the centre right image on a data processing device to conform the images to a first virtual model having three planar surfaces, the planar surfaces comprising a centre plane, a left angled plane and a right angled plane, the left angled plane and the right angled plane extending from the centre plane at a predefined angle toward a viewpoint;
  obtaining a composite image from the manipulated centre image, centre left image and centre right image conformed to the first virtual model;
  manipulating the composite image on the data processing device to conform the composite image to a second virtual model having three surfaces, the surfaces comprising a centre plane, a left curved surface and a right curved surface, the left curved surface and right curved surface extending from the centre plane at a predefined angle toward a viewpoint;
  obtaining a distortion adjusted image from the composite image conformed to the second virtual model;
  creating a physical image of the distortion adjusted image; and
  physically manipulating the physical image to form a physical image having a planar centre portion and curved left and right portions extending toward a viewpoint.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

Preferably including displaying said image in a display stand.

Preferably said display stand is concave toward a viewer on the left and right sides of said stand.

Preferably said preferred lens is a 28 mm lens.

Preferably the number of core images is five.

Preferably said five core images comprise a centre image, a left and a right image taken at 30 degrees to the left and right of said centre image and a top and bottom image taken 7 degrees up and down from said centre image.

Preferably said image for display is between 140 and 180 cm wide and between 40 and 60 cm high.

Preferably said image for display is 150.5 cm wide and 52.1 cm high.

Preferably said image is preferably viewed from a distance of 50 cm in front of said image.

Preferably said method is implemented in software.

As used herein the term "and/or" means "and" or "or", or both.

As used herein "(s)" following a noun means the plural and/or singular forms of the noun.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

BRIEF DESCRIPTION OF THE DRAWINGS

FIG. 12 is a sketch illustrating the image of FIG. 8 having been corrected.

DETAILED DESCRIPTION OF THE INVENTION

Figure 1:
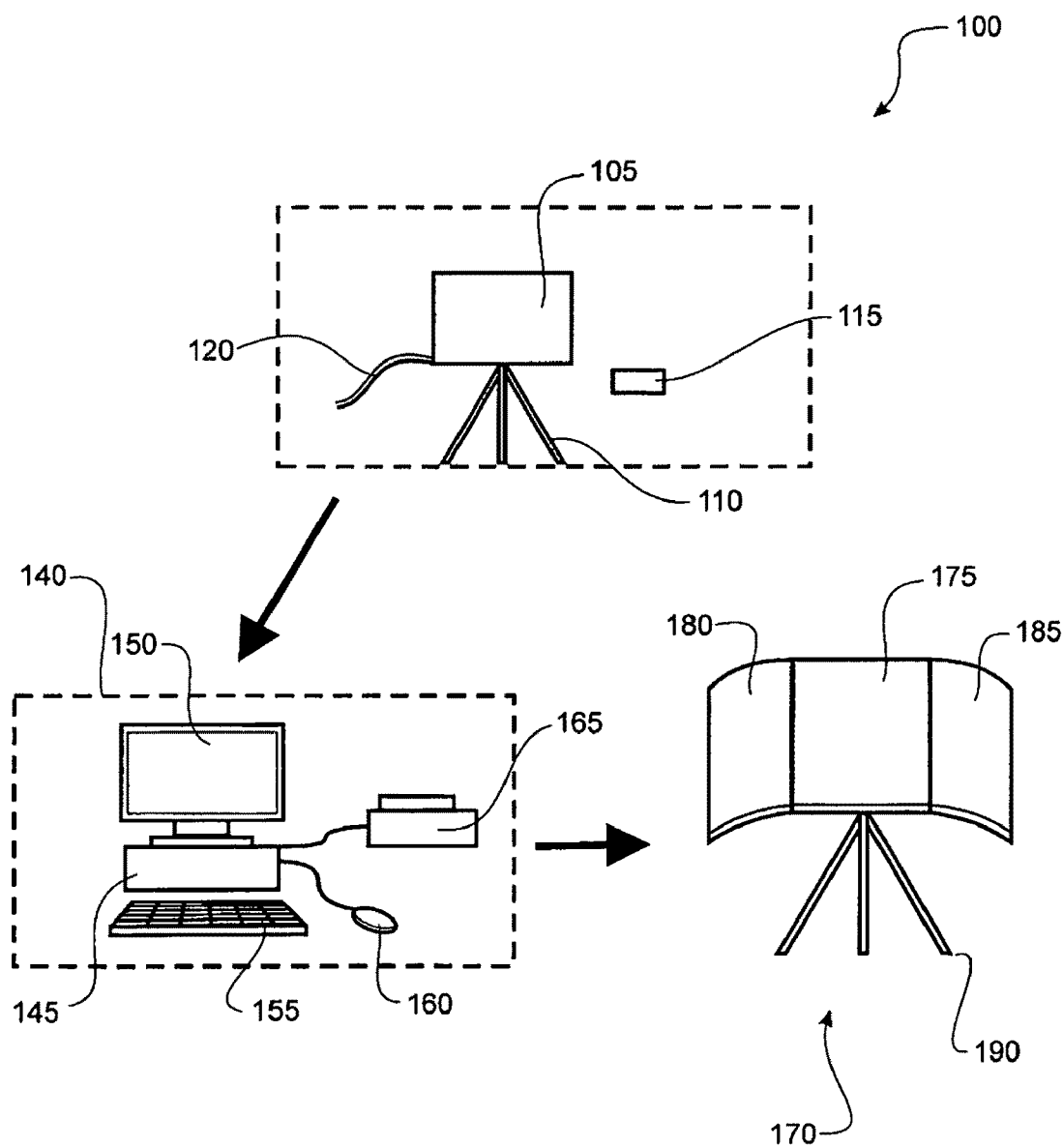
FIG. 1 is a schematic diagram of a system suitable for the invention.

FIG. 1 shows camera apparatus 100 suitable for use with the invention. Camera apparatus includes a camera device 105 configured to capture digital images of a scene. Camera 105 is mounted on a tripod 110. The arrangement of the mounting is such that the camera is able to rotate in a horizontal and/or vertical plane with respect to the tripod 110.

Camera 105 is configured to store captured digital images within a memory. In some cases this memory includes a removable memory stick 115. In other cases the camera includes an internal memory (not shown). Camera 105 may also include data cable 120. Removable memory stick 115 and/or data cable 120 are used to transfer digital images from camera 105 to further electronic devices. Camera 105, tripod 110 and/or memory stick 115 and data cable 120 are used for an image capture process described below.

System 100 further includes a data processing device 140 configured to receive digital images from the camera 105 and perform digital manipulation to those images. The data processing device 140 includes a CPU 145, a screen display device 150 and peripheral input devices such as a keyboard 155 and mouse 160. In some cases display device 150 will be touch sensitive and be able to receive user input. A further peripheral includes a printing device 165 to produce hard copy images of digital images manipulated with data processing device 140.

The system further includes a display stand 170. The display stand includes a substantially flat centre panel 175 and curved left and right panels 180 and 185. Display stand 170 optionally includes height adjustment mechanisms such as a tripod 190.

Image Capture

Figure 2:
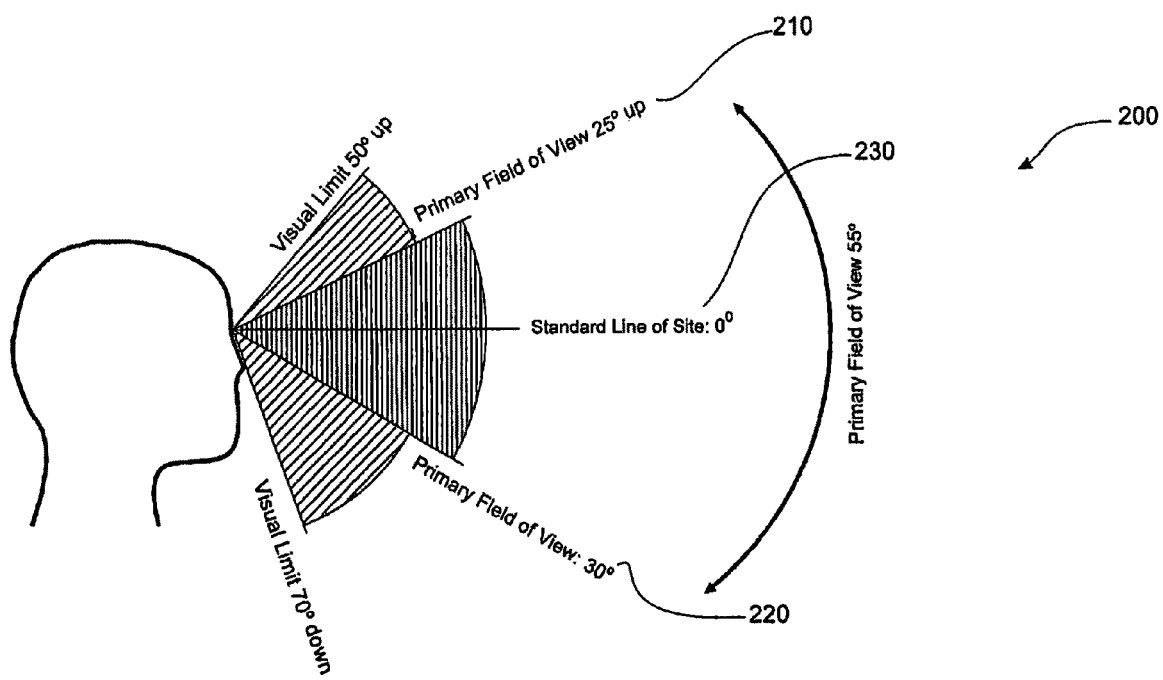
FIG. 2 is an illustration of the primary human vertical field of view.
Figure 3:
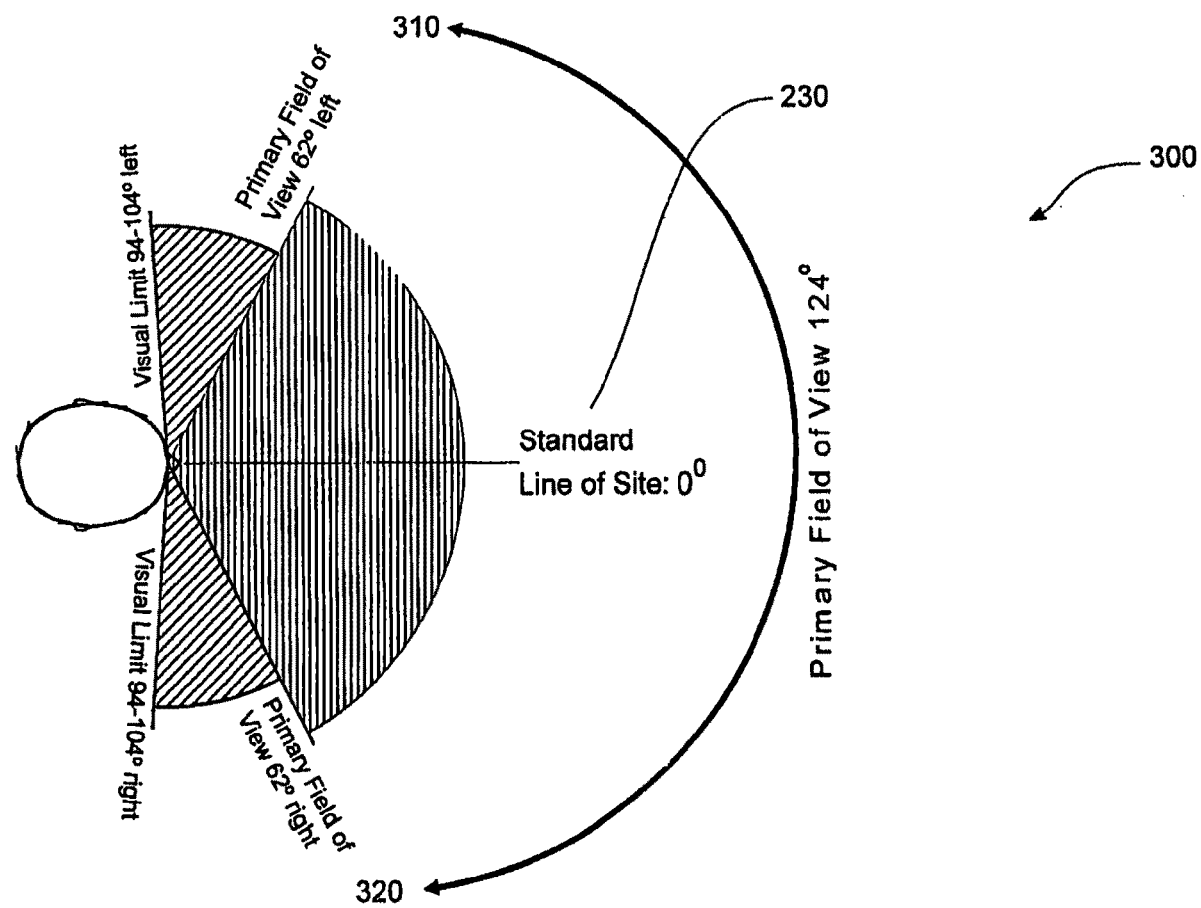
FIG. 3 is an illustration of the primary human horizontal field of view.

FIG. 2 and FIG. 3 illustrate the horizontal 200 and vertical 300 primary human fields of view. The primary field is 25 degrees up 210 and 30 degrees down 220 from the standard line of sight 230. The primary field of view is also 62 degrees left 310 and right 320 from the standard line of sight 230. This gives a vertical primary field of view of 55 degrees and a horizontal primary field of view of 124 degrees.

Figure 4:
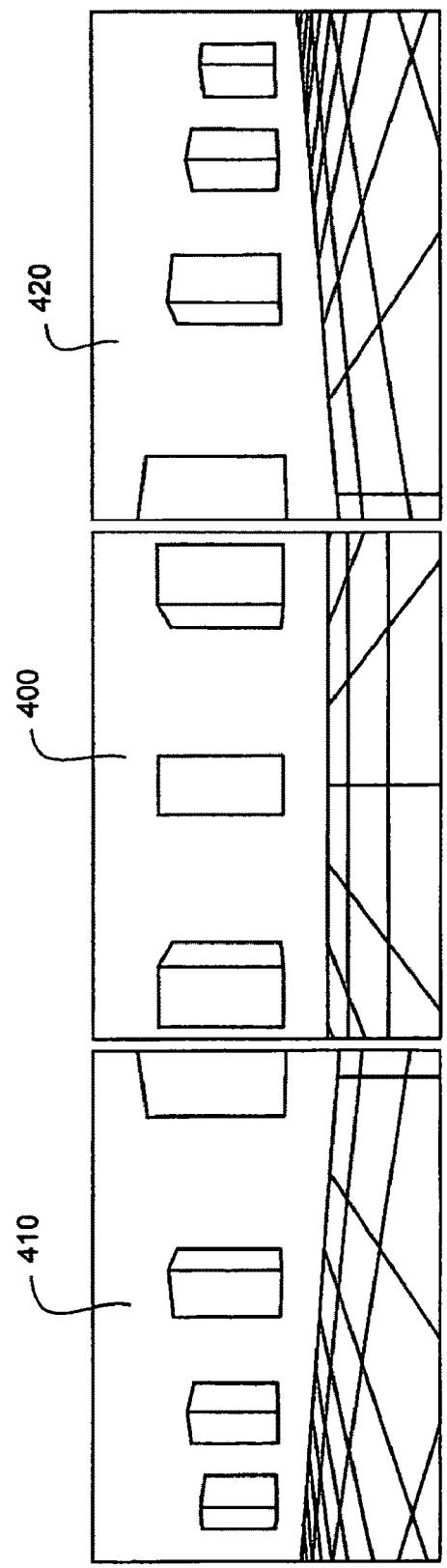
FIG. 4 showing the individual images before they are merged.

The invention requires at least three and optionally up to 9 images taken on site. FIG. 4 illustrates one embodiment in which three images are taken. The camera 105 takes a centre image 400 with the camera facing a scene directly. The camera is rotated approximately 30 degrees to the left of centre to take a centre left image 410. The camera is rotated approximately 30 degrees to the right of centre to take a centre right image 420. It will be appreciated that images 400, 410 and 420 could be captured in any order.

Following image capture it is anticipated that images 400, 410 and 420 are stored in electronic form in one of the memory devices associated with camera 105. Images 400, 410 and 420 are transferred to a data processing device for digital manipulation described below to create a single image and single vanishing point from images 400, 410 and 420.

As a 28 mm lens has a vertical field of view of 51.481 degrees and thus does not have a vertical field of view of 55 degrees, then in order build a composite image with a vertical field of view of 55 degrees using this lens we need to capture two images by rotating the camera approximately 7 degrees upwards from the centre image and again 7 degrees downwards from the centre image in order to capture enough additional photographic material to produce a final image with a vertical field of view of 55 degrees.

However if we capture the centre image using a 24 mm lens then we do not need to rotate the camera and capture any additional material as a 24 mm lens has a vertical field of view of 58.716 mm Digital Manipulation Images 400, 410 and 420 are transferred to a data processing device 140 for further processing. The images are combined into a single image having a single vanishing point. The data processing device has installed and operating on it suitable three-dimensional software to manipulate and align the images. Suitable software includes Autodesk-3D Studio MAX, Autodesk-Maya, Autodesk-Viz, Autodesk-AutoCAD Architectural Desktop. Any other suitable three-dimensional software may be used.

Figure 5:
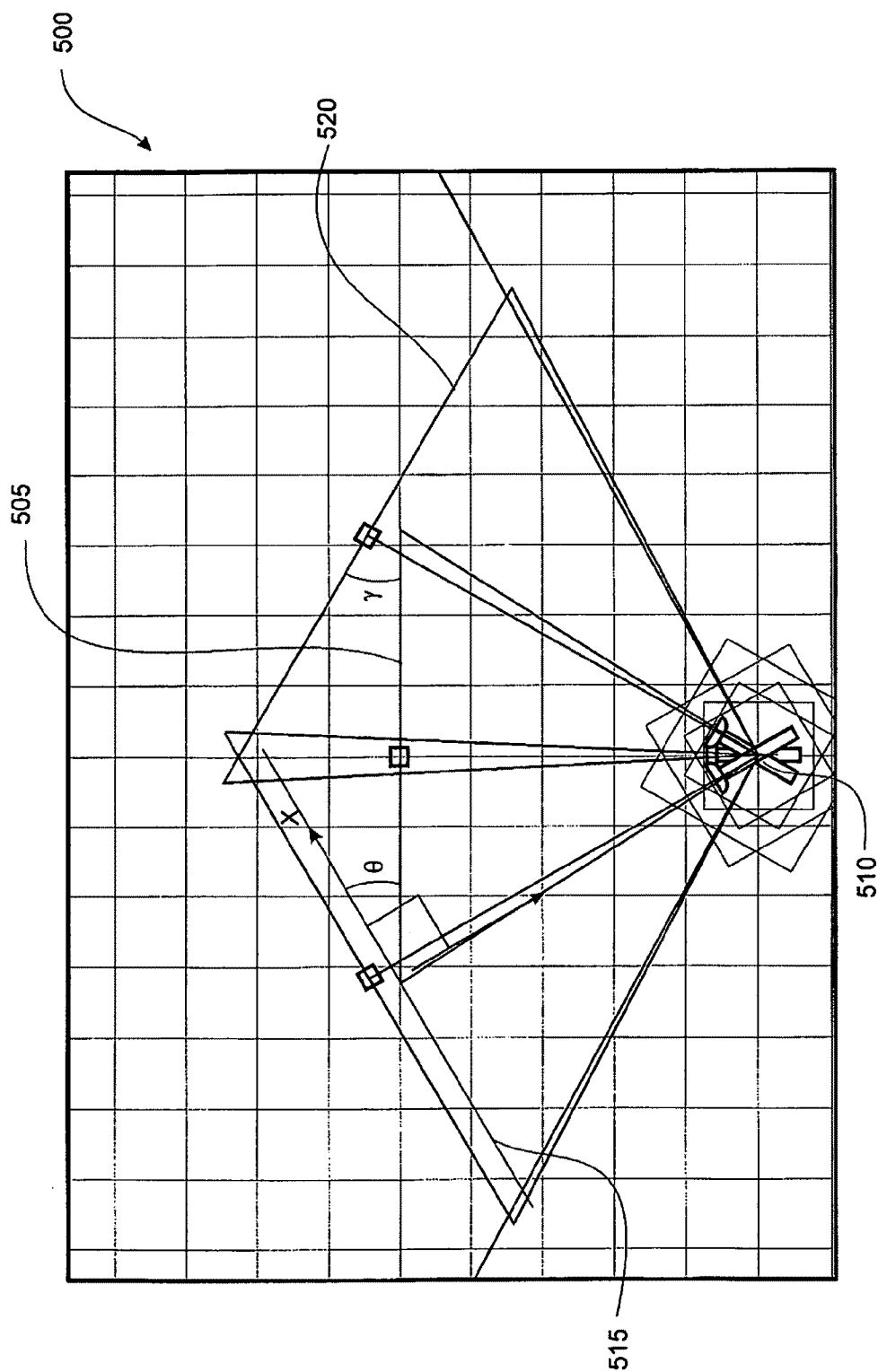
FIG. 5 shows a virtual model or frame.

As shown in FIG. 5 a virtual model or frame 500 is defined within the three dimensional software. The frame includes a centre plane 505 that is perpendicular to a line connecting a user viewpoint 510 to the centre plane. Also included in the model is a left angled plane 515 and a right angled plane 520. As shown in FIG. 5, centre plane 505 bisects the left most plane 515 at one end of the centre plane and bisects the right plane 520 at the other end of the centre plane.

The left plane 515 is preferably set at a defined angle θ to centre plane 505.

Right most plane 520 is preferably angled to centre plane 505 at a predefined angle γ.

Figure 6:
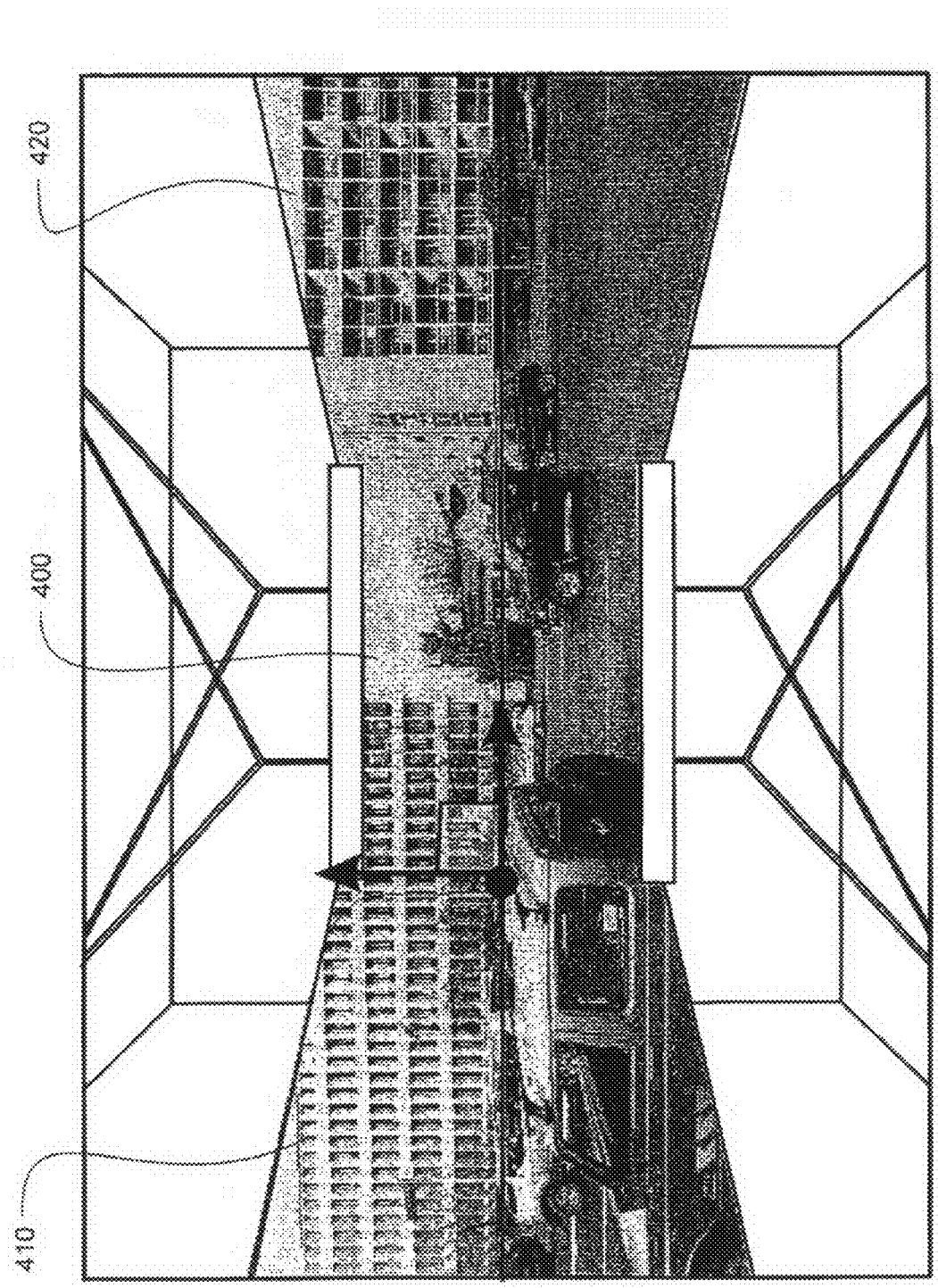
FIG. 6 shows images conformed to the frame of FIG. 5.

As shown in FIG. 6, centre image 400 is placed virtually onto centre plane 505 directly in front of the user viewpoint. Image 410 is placed on left plane 515 and right image 420 is placed on right plane 520. The visual effect of the three images on display device 150 is of a centre image 400 with two further images adjacent the centre image at each end and extending toward the viewer at a 30 degree angle.

The angle of rotation for left and right images is preferably approximately the same as the angle the camera was rotated from centre to obtain images 410 and 420. In this case the preferred angle of image rotation is 30 degrees.

Any outdoor photography taken at different angles produces images of differing exposures depending on the relative angle of the camera to the sun. This results in the separate photographic images differing in appearance relative to each other with regards to light and color. Therefore these differences need to be averaged out across all images. This is achieved by editing the images in standard 2D photo editing software.

There are also very slight anomalies created because camera lenses are not manufactured perfectly. This results in slight mismatches when lining up the images when combining them. This can create the appearance of a slight seam appearance at each image join. This anomaly needs to be edited, or brushed out using standard photo editing software to create a seamless single image.

As we need to simulate a horizontal view of 124 degrees to replicate our primary horizontal field of view, this equates to the horizontal field of view of a non distorting 9.571 mm lens if such a lens actually existed. Fortunately we can simulate a perfectly non distorting 9.571 mm lens in standard 3D software.

Figure 7:
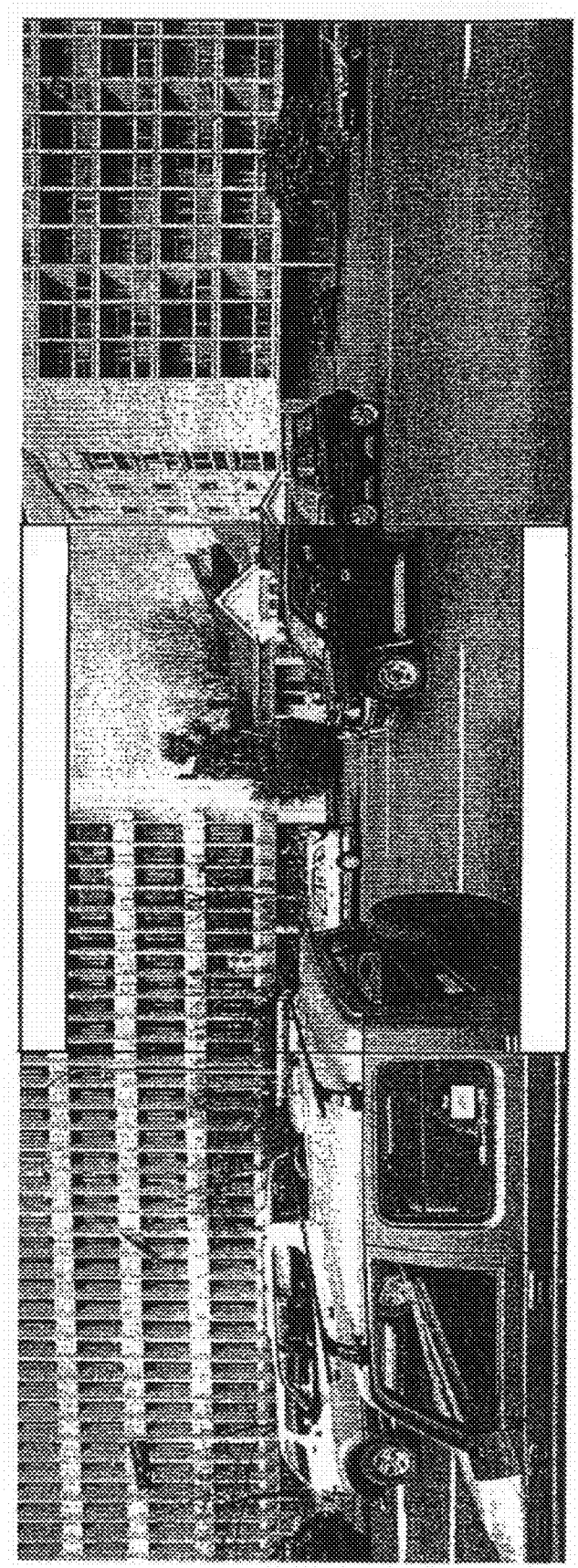
FIG. 7 shows the image of FIG. 6 following cropping.

The image shown in FIG. 7 is in fact a result of generating an image of the composite image combined in FIG. 5 as it would appear if it had been actually photographed using a 9.571 mm lens if such a thing actually existed.

The resulting image is cropped to form an image somewhat similar to a rectangular image as shown in FIG. 7.

Figure 8:
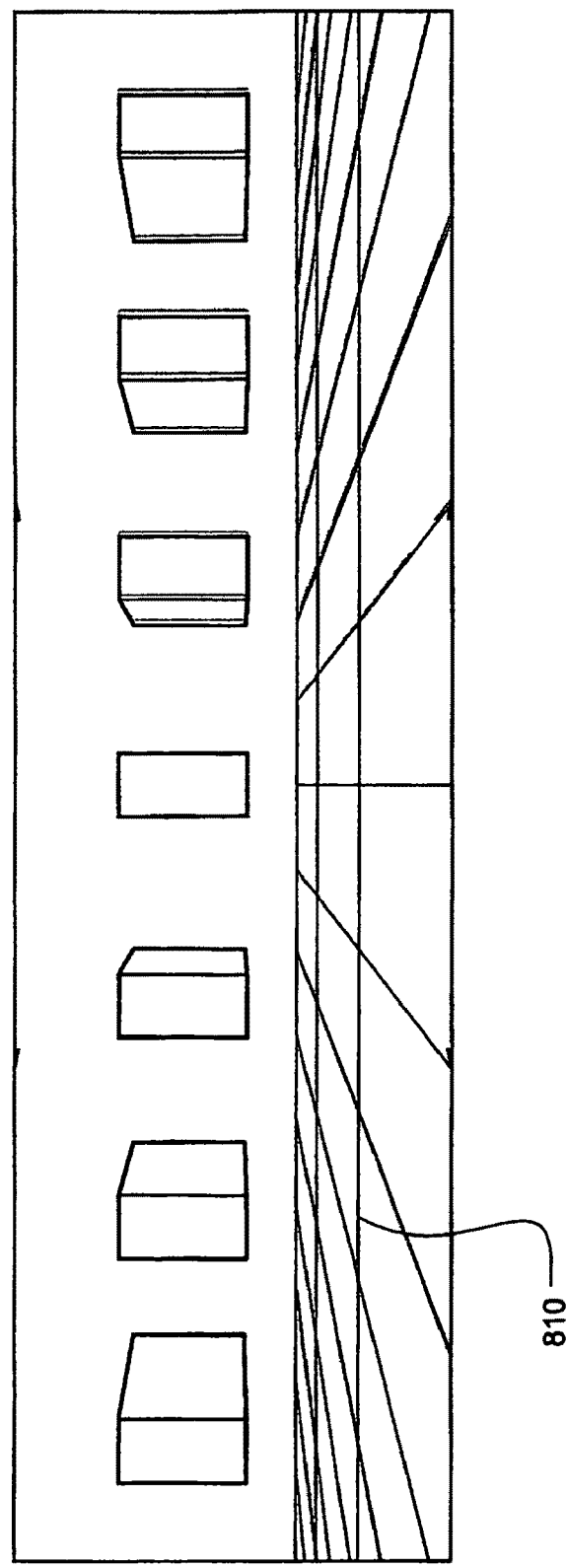
FIG. 8 is a sketch showing images illustrated in FIG. 4 merged together.

As seen in FIG. 8, this results in the perpendicular lines 810 of the image being almost parallel across the combined image. To this first stage the process is similar to rectilinear projection. Although rectilinear projections is usually carried out by selecting a number of points by eye on the flat images and allowing two dimensional software to create parallel lines by aligning the points to create parallel lines. However objects at the far left and right angle of view are horizontally distorted or stretched in this first step. At this stage, no correction is made to correct this horizontal distortion which is proportionally greater the further left an object is in the left image and the further right an object is in the right image relative to the viewer.

The combined image is saved to a data memory associated with the processing device.

Distortion Correction

The next stage is to correct the proportional size distortion of objects in the far left and far right angle of view relative to the viewer. This is done by a further three dimensional process of aligning the stage one processed left and right images correctly relative to the centre image and then bending the far ends of the left and right images at a 30 degree arc from the centre image and towards the viewer. Thus when the final image is correctly processed and printed to view it accurately, it must be placed correctly within the viewing stand which physically duplicates the 30 degree bending of the left and right images.

Figure 9:
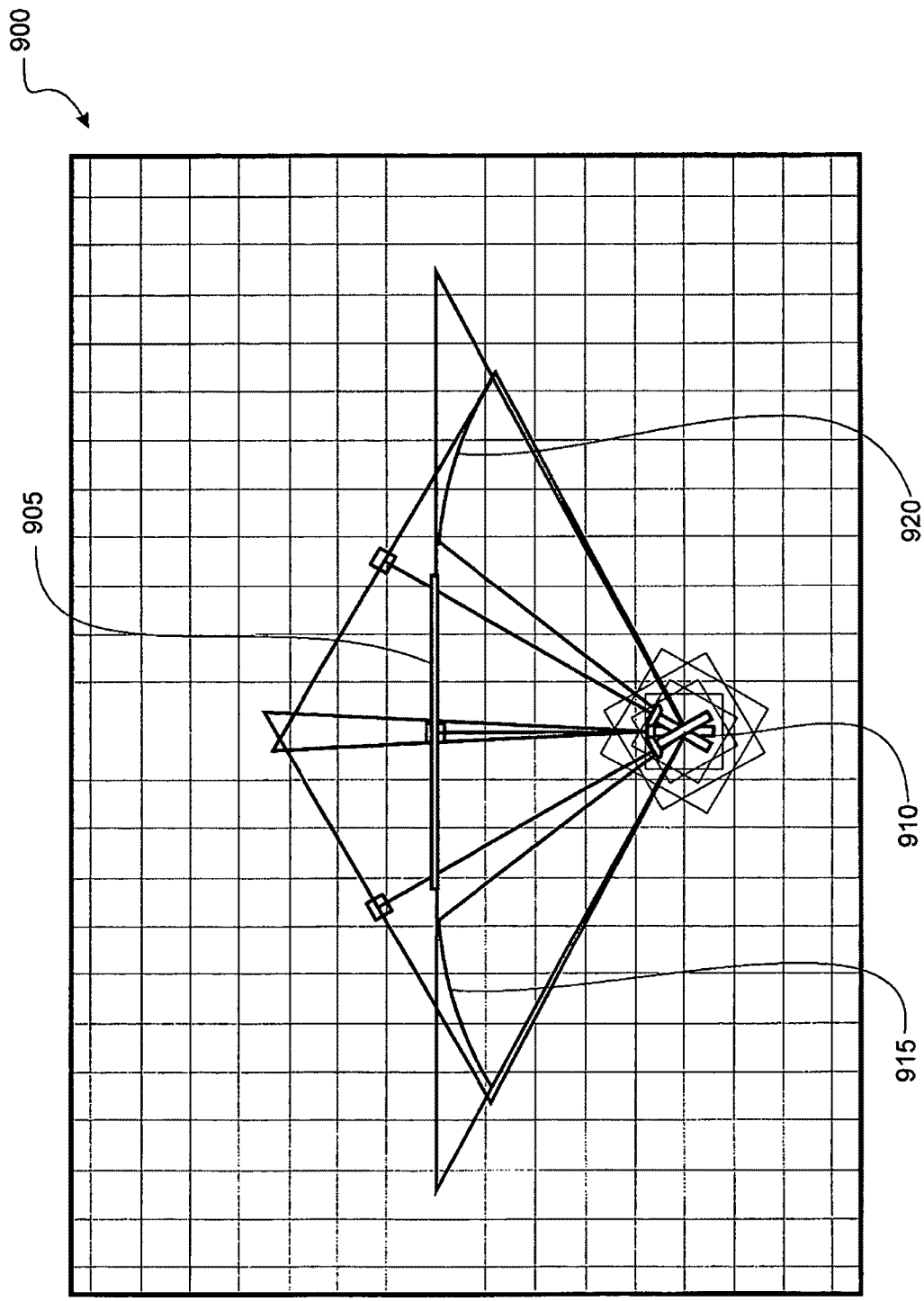
FIG. 9 shows a further virtual model or frame.

As shown in FIG. 9, a virtual model or frame 900 is defined within the three dimensional software. The frame includes a centre plane 905 that is perpendicular to a line connecting a user viewpoint 910 to the centre plane. Centre plane 905 of the virtual model shown in FIG. 9 is preferably a flat planar surface. Extending from each end of the centre plane 905 is a left most curved surface 915 and a right most curved surface 920.

Left surface 915 and right surface 920 are curved inwardly toward the user viewpoint 910. The left and right surfaces are preferably bent at an arc that is substantially the same as the angles of left and right planes 515 and 520 in FIG. 5. The angle of curvature of the left and right planes 915 and 920 are also preferably the same as the angle of rotation of the camera 105 during image capture.

The virtual frame in FIG. 9 represents a single surface that is flat along a central portion and curved at each end of the frame.

Figure 10:
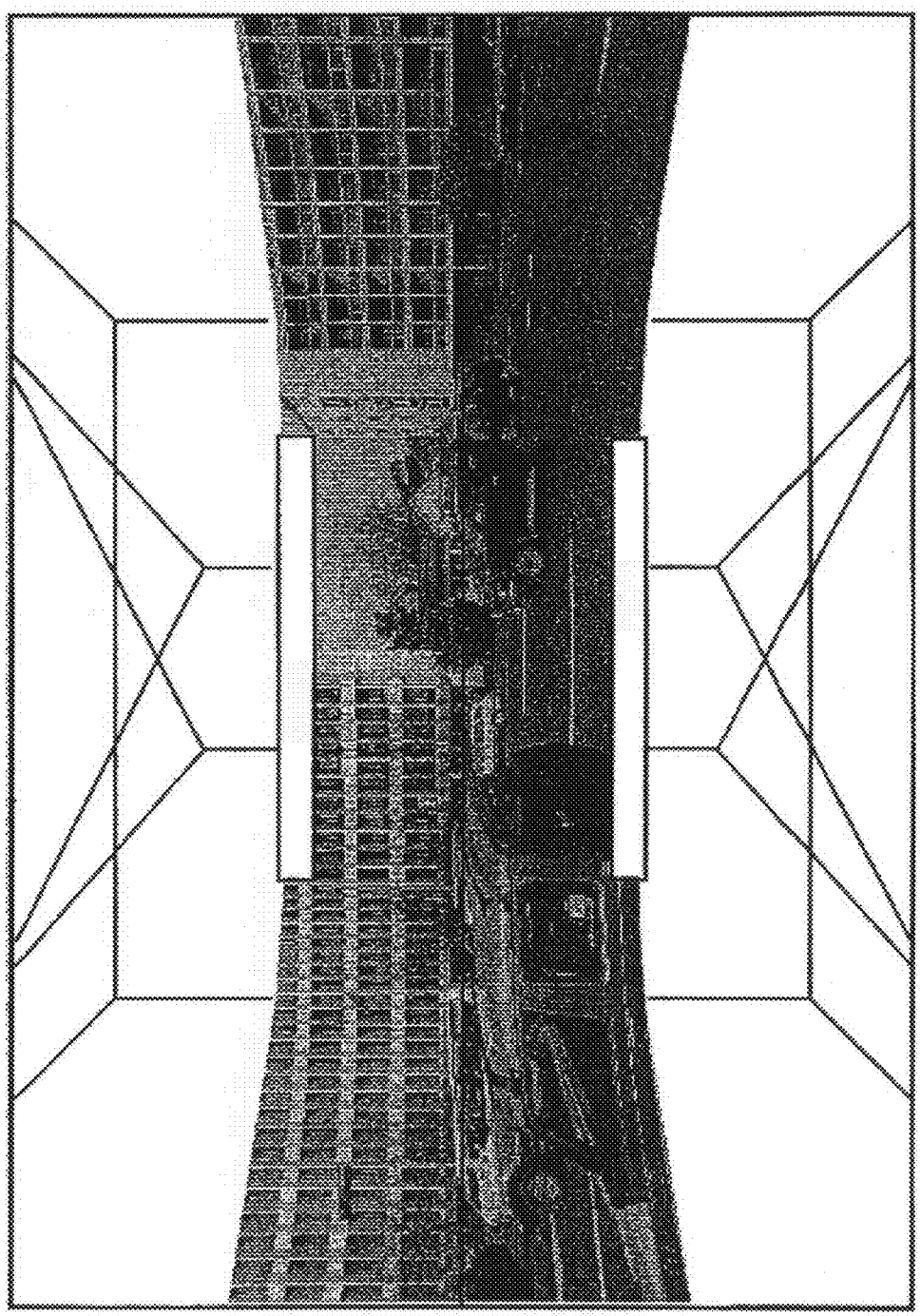
FIG. 10 shows the image of FIG. 7 conformed to the frame of FIG. 9.

The combined image such as that shown in FIG. 7 is retrieved from computer memory and placed virtually onto or conformed to the frame shown in FIG. 9. The resulting distortion corrected image is shown virtually placed on the frame in FIG. 10.

The angle of manipulation of the left side of the image is preferably the same as the angle by which the camera was rotated from the centre line to take the picture, and the same as the angle by which the image was rotated. The angle of manipulation of the right side of the image is preferably the same as the angle by which the camera was rotated from the centre line to take the centre right picture, and the same as the angle by which the image was rotated.

It is also envisaged that software including Autodesk-3D Studio MAX, Autodesk-Maya, Autodesk-Viz, Autodesk-AutoCAD Architectural Desktop is used to complete the distortion correction stage. Any other suitable three-dimensional software may be used.

Figure 11:
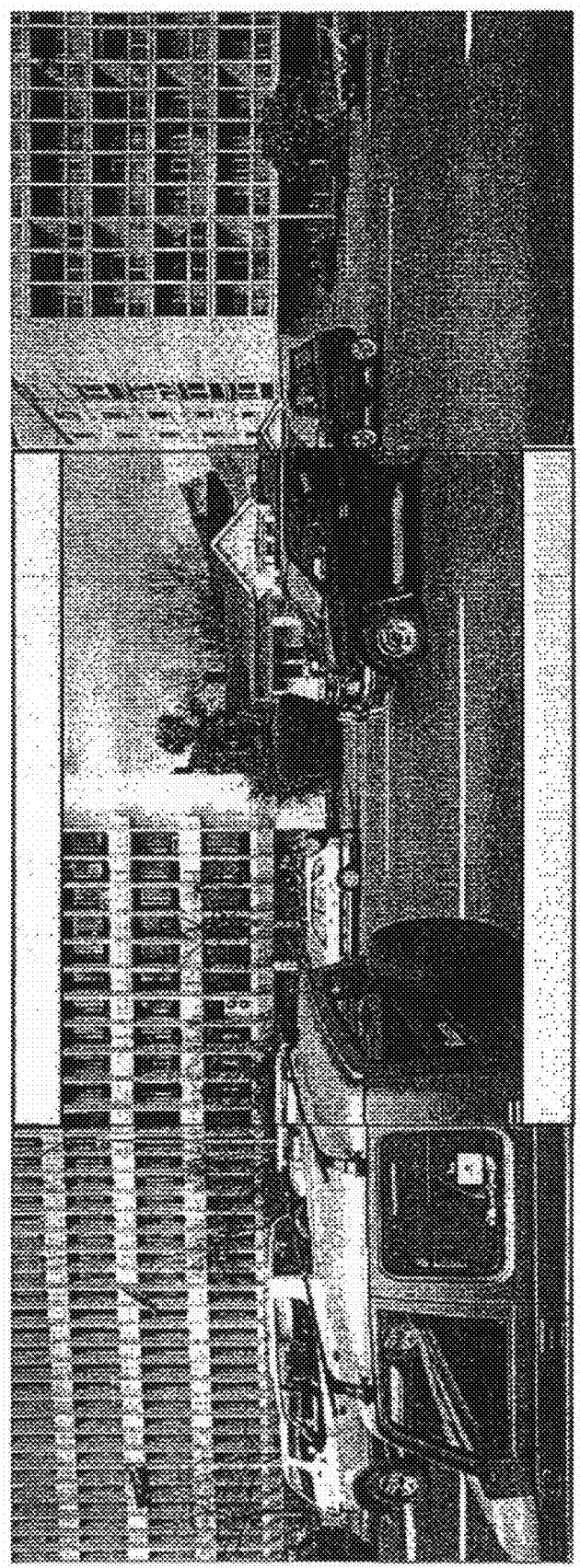
FIGS. 11 and 12 show examples of images in which distortion has been corrected.
Figure 12:
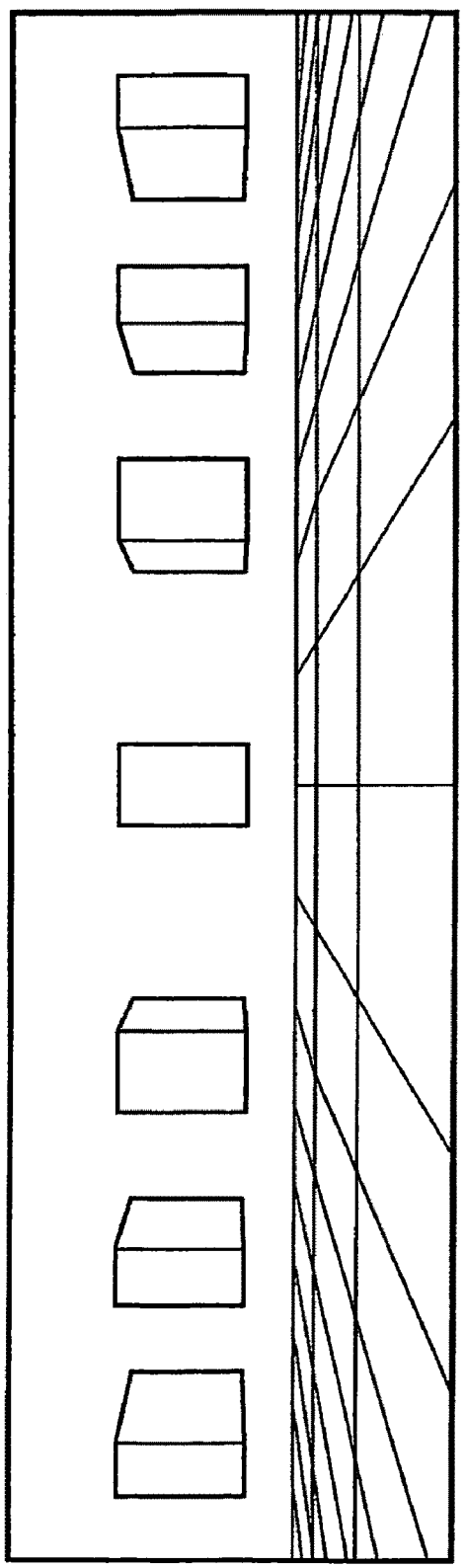

FIGS. 11 and 12 show the correction performed by the perspective image correction.

Physical Manipulation

An electronic copy of the distortion corrected image is retrieved from the data memory. A physical copy of the combined image is produced using the printing device 165 associated with the processing device 140.

In order to correctly view the corrected image it is necessary to physically manipulate the physical copy to replicate the left and right 30 degrees of arc bends. The centre image is flat while the left and right images curve towards the viewer 30 degrees. The preferred physical image has a planar centre portion and curved left and right portions extending toward a viewpoint. Image holder 170 provides a viewer standing at 50 cm from the centre of the image to see an accurate representation of the primary human field of view. The image holder 170 maintains the image in a physically manipulated state.

The preferred horizontal distance between the extreme edges of left panel 180 and right panel 185 is between 145 and 148 cm for a 28 mm image.

Figure 13:
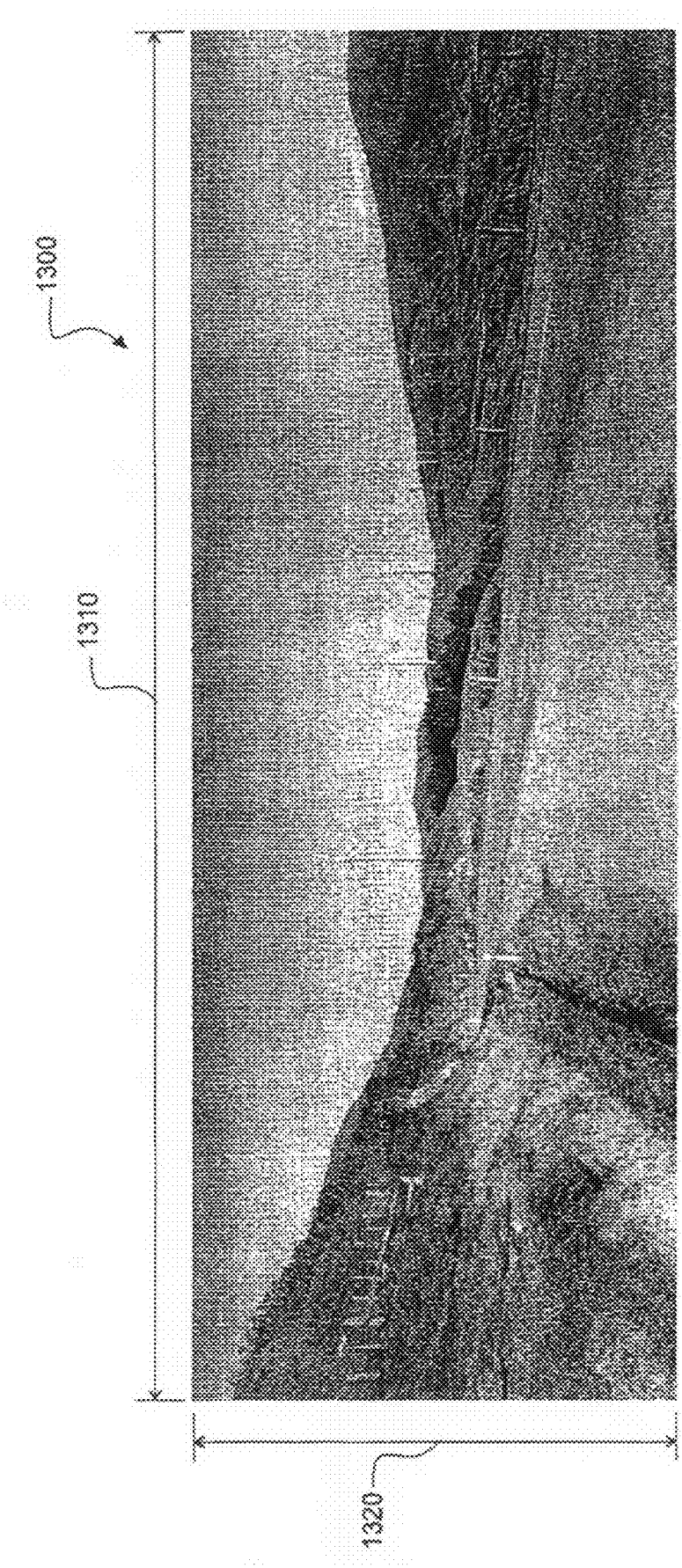
FIG. 13 is an illustration of a photograph image processed using the present invention.

The image of the present invention an example of which can be seen in FIG. 13 is 124 degrees wide and 55 degrees high. Based on experiment the inventors of the present invention have discovered that a photograph 1300 150.5 cm wide 1310 and 52.1 cm high 1320 placed correctly in a display stand 170 and held 50 cm from the eyes allows a viewer to see almost what they would see if standing at the point where the photograph was taken.

Figure 14:
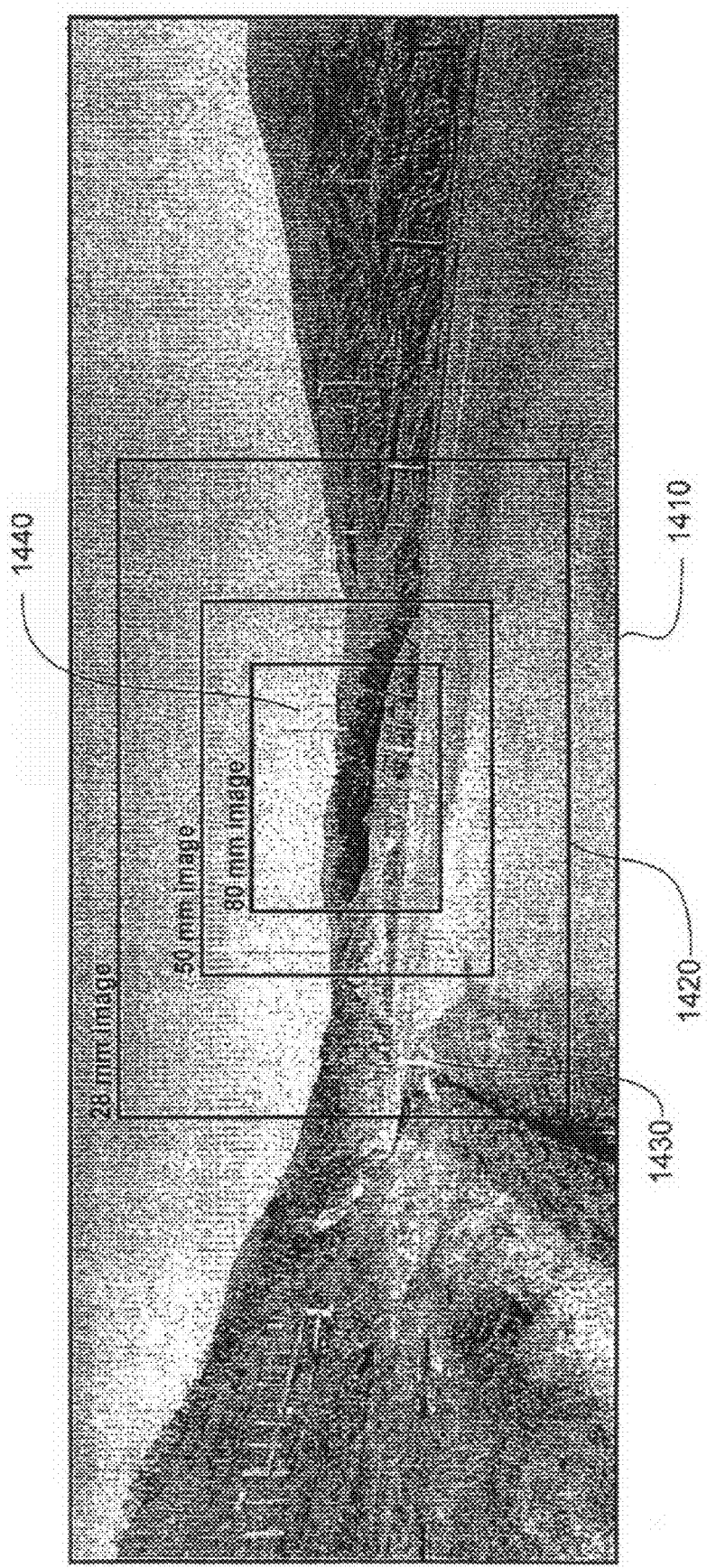
FIG. 14 is a photograph image comparing the size of the present invention and the size of various photographs taken using various size lenses.

FIG. 14 illustrates the limited scope of standard lenses compared to the view presented by the present invention. The present invention is able to represent the whole primary human field of view 1410. While even a 28 mm lenses 1420 can only capture a small part. 50 mm lenses 1430 and 80 mm lenses 1440 capture an even smaller view.

Because our preferred lens is a 28 mm lens and the primary vertical field of view is 55 degrees to complete the final image additional photographs need to be taken and merged into the final result. Accordingly the camera is tilted 7 degrees above and below the angle of the centre image. The number of images that need to be taken depends upon the lens selected. A 50 mm lens would require more photos to be merged then the preferred 28 mm lens.

The present invention is suitable for use in the resource consent area and it is envisaged that a representation of a proposed building or other structure may be superimposed into the corrected image so that a person may see what the environment would look like with the proposed building or structure in place.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention claimed is:

1. A method of replicating the primary human field of view of an image, the method comprising:

receiving at least three digital images of a scene, the digital images comprising a centre image facing a scene directly, a centre left image obtained by rotating an image capture device a predefined angle to the left of centre and a centre right image obtained by rotating the image capture device a predefined angle to the right of centre;

manipulating the centre image, the centre left image, and the centre right image on a data processing device to conform the images to a first virtual model having three planar surfaces, the planar surfaces comprising a centre plane, a left angled plane and a right angled plane, the left angled plane and the right angled plane extending from the centre plane at a predefined angle toward a viewpoint;

obtaining a composite image from the manipulated centre image, centre left image and centre right image conformed to the first virtual model;

manipulating the composite image on the data processing device to conform the composite image to a second virtual model having three surfaces, the surfaces comprising a centre plane, a left curved surface and a right curved surface, the left curved surface and right curved surface extending from the centre plane at a predefined angle toward a viewpoint;

obtaining a distortion adjusted image from the composite image conformed to the second virtual model;

creating a physical image of the distortion adjusted image; and physically manipulating the physical image to form a physical image having a planar centre portion and curved left and right portions extending toward a viewpoint.

2. The method of replicating the primary human field of view of an image as claimed in claim 1 including the step of displaying said image in a display stand.

3. The method of replicating the primary human field of view of an image as claimed in claim 2 wherein said display stand is concave toward a viewer on the left and right sides of said stand.

4. The method of replicating the primary human field of view of an image as claimed in claim 1 wherein one or more of the digital images are obtained using a 28 mm lens.

5. The method of replicating the primary human field of view of an image as claimed in claim 1 wherein the number of core images is 5.

6. The method of replicating the primary human field of view of an image as claimed in claim 5 wherein said five core images comprise a centre image, a left image taken at 30 degrees to the left of the centre image, a right image taken at 30 degrees to the right of said centre image, a top image taken 7 degrees up from said centre image and a bottom image taken 7 degrees down from said centre image.

7. The method of replicating the primary human field of view of an image as claimed in claim 1 wherein said image for display is between 140 and 180 cm wide and between 40 and 60 cm high.

8. The method of replicating the primary human field of view of an image as claimed in claim 1 wherein said physical image for display is 150.5 cm wide and 52.1 cm high.

9. The method of replicating the primary human field of view of an image as claimed in claim 8 wherein said physical image is viewed from a distance of 50 cm in front of said physical image.

10. A non-transitory computer readable medium having stored thereon computer-executable instructions that, when executed by a processor, cause the processor to perform at least part of a method of replicating the primary human field of view of an image, the method comprising:

receiving at least three digital images of a scene, the digital images comprising a centre image facing a scene directly, a centre left image obtained by rotating an image capture device a predefined angle to the left of centre and a centre right image obtained by rotating the image capture device a predefined angle to the right of centre;

manipulating the centre image, the centre left image, and the centre right image on a data processing device to conform the images to a first virtual model having three planar surfaces, the planar surfaces comprising a centre plane, a left angled plane and a right angled plane, the left angled plane and the right angled plane extending from the centre plane at a predefined angle toward a viewpoint;

obtaining a composite image from the manipulated centre image, centre left image and centre right image conformed to the first virtual model;

manipulating the composite image on the data processing device to conform the composite image to a second virtual model having three surfaces, the surfaces comprising a centre plane, a left curved surface and a right curved surface, the left curved surface and right curved surface extending from the centre plane at a predefined angle toward a viewpoint;

obtaining a distortion adjusted image from the composite image conformed to the second virtual model;

creating a physical image of the distortion adjusted image; and physically manipulating physical image to form a physical image having a planar centre portion and curved left and right portions extending toward a viewpoint.

* * * * *